C. A. HOWELL.
LAMP SUPPORTING AND TURNING MECHANISM.
APPLICATION FILED MAR. 18, 1909.
979,495.
Patented Dec. 27, 1910.
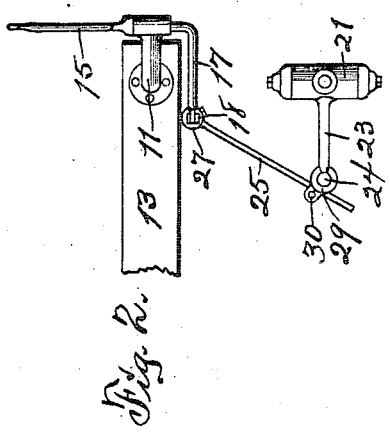
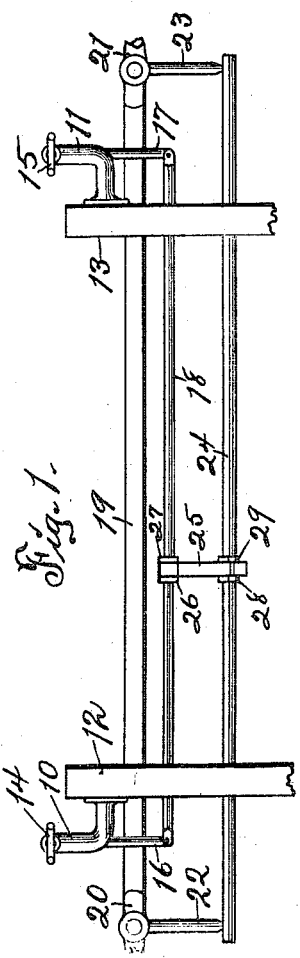

UNITED STATES PATENT OFFICE.

CHESTER A. HOWELL, OF DES MOINES, IOWA.

LAMP SUPPORTING AND TURNING MECHANISM.

979,495.  Specification of Letters Patent.  Patented Dec. 27, 1910.

Application filed March 18, 1909. Serial No. 484,824.

*To all whom it may concern:*

Be it known that I, CHESTER A. HOWELL, a citizen of the United States of America, and resident of Des Moines, Polk county, Iowa, have invented a new and useful Lamp Supporting and Turning Mechanism, of which the following is a specification.

The object of this invention is to provide improved means for turning a headlight coincident with any deviation of a vehicle, carrying such light, from a true course or straight path for the purpose of lighting a roadway in advance of such vehicle regardless of the curvatures of the path to be traveled.

My invention consists in the construction, arrangement and combination of elements hereinafter set forth, pointed out in my claims and illustrated by the accompanying drawing, in which—

Figure 1 is a plan and Fig. 2 an end elevation of my device.

In the construction of the device as shown the numerals 10, 11 designate lamp brackets fixed to and projecting outwardly and forwardly from portions of the frame of an automobile such as sills 12, 13. Forks 14, 15 are mounted vertically and pivoted in forward extremities of the brackets 10, 11 and said forks are adapted to receive and support lamps of common form (not shown) such as are employed as headlights for automobiles. Stems of the forks 14, 15 extend downwardly from the brackets 10, 11 and arms 16, 17 are formed on said stems and extend rearwardly therefrom. The rear extremities of the arms 16, 17 are connected pivotally by a rod 18. This device is adapted to be employed on an automobile having a forward fixed axle 19 and wheel bearers 20, 21 pivoted thereto and adapted to be supported by and guide steering wheels of common form (not shown). Arms 22, 23 are fixed to and extend rearwardly from the wheel bearers 20, 21 and the rear ends of said arms are connected flexibly to a steering bar 24 parallel with the rod 18. A bar 25 is pivoted at one end to the rod 18 and is secured against movement longitudinally of said rod by collars 26, 27 fixed to said rod on opposite sides of said bar. Collars 28, 29 are fixed to the steering bar 24 and a pin 30 connects said collars above said bar. The rear end portion of the bar 25 extends between the collars 28, 29 and between the pin 30 and bar 24 and thus is pivotally and slidingly attached to the steering bar and restrained from movement longitudinally thereof.

In practical operation headlights are mounted on the forks 14, 15 and the rays of the lamp therein are directed forwardly. So long as the automobile advances in the straight course the arms 16, 17 hold the lamps in such position; but when the machine is diverted from a straight course in either direction, through rectilinear reciprocation of the steering bar 24, said arms are oscillated through the medium of the bar 25, rod 18 and connections in such manner as to turn the forks 14, 15 and direct the rays of the lamp at angles to their former directions and in a manner to light the pathway ahead and in the new course of the machine.

I claim as my invention—

1. A lamp supporting and turning mechanism, comprising lamp forks mounted for oscillation on vertical axes, arms on said forks, a rod extended between and pivoted at its ends to extremities of the arms, a bar pivoted at one end to said rod between said arms, a steering bar, collars on said steering bar, and a pin connecting said collars and arranged parallel with said steering bar, one end portion of said pivoted bar extending loosely through the space between said collars and between the pin and steering bar, whereby said bar has a movement transversely of the steering bar to compensate for vertical oscillation of the rod relative to said steering bar.

2. A lamp supporting and turning mechanism, comprising lamp forks mounted for oscillation on vertical axes, arms on said forks, a rod extended between and pivoted at its ends to extremities of the arms, a bar pivoted at one end to and for oscillation on said rod between said arms, collars fixed to said rod on opposite sides of and adjacent to said pivoted bar, a steering bar, and sliding connections between said steering bar and the first bar.

Signed by me at Des Moines, Iowa, this 13th day of March 1908.

CHESTER A. HOWELL.

Witnesses:
S. C. SWEET,
C. G. ROSELL.